(12) United States Patent
Fu et al.

(10) Patent No.: US 11,828,968 B2
(45) Date of Patent: Nov. 28, 2023

(54) BACKLIGHT MODULE INCLUDING OPTICAL FILM AND MANUFACTURING METHOD THEREOF

(71) Applicant: TCL CHINA STAR OPTOELECTRONICS TECHNOLOGY CO., LTD., Shenzhen (CN)

(72) Inventors: Linlin Fu, Shenzhen (CN); Dehua Li, Shenzhen (CN); Xin Zhang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 486 days.

(21) Appl. No.: 17/049,941

(22) PCT Filed: Jul. 9, 2020

(86) PCT No.: PCT/CN2020/101013
§ 371 (c)(1),
(2) Date: Oct. 22, 2020

(87) PCT Pub. No.: WO2021/243802
PCT Pub. Date: Dec. 9, 2021

(65) Prior Publication Data
US 2023/0132319 A1    Apr. 27, 2023

(30) Foreign Application Priority Data
Jun. 2, 2020 (CN) .......................... 202010488219.6

(51) Int. Cl.
*F21V 8/00* (2006.01)
*C09D 17/00* (2006.01)
*G02F 1/13357* (2006.01)

(52) U.S. Cl.
CPC ......... *G02B 6/0043* (2013.01); *C09D 17/008* (2013.01); *G02B 6/0055* (2013.01);
(Continued)

(58) Field of Classification Search
CPC .............. C09D 17/008; G02B 6/0055; G02F 1/133605; G02F 1/133606
See application file for complete search history.

(56) References Cited

U.S. PATENT DOCUMENTS 9,052,543 B2 * 6/2015 Jeong ................ G02F 1/133606
2005/0195619 A1 9/2005 Tseng
(Continued)

FOREIGN PATENT DOCUMENTS

CN           1851540 A       10/2006
CN         101749668 A        6/2010
(Continued)

OTHER PUBLICATIONS

English Machine Translation of CN 109266097 A (Year: 2019).*

*Primary Examiner* — Keith G. Delahoussaye
(74) *Attorney, Agent, or Firm* — PV IP PC; Wei Te Chung; Zhigang Ma

(57) ABSTRACT

A backlight module and a method of manufacturing the backlight module are disclosed. The backlight module includes a substrate including a first end and a second end opposite to the first end. An ink layer is disposed on the substrate and has a reflectivity gradually increasing from the first end to the second end. At least two of light-emitting units are arranged in an array on the ink layer.

17 Claims, 2 Drawing Sheets

(52) U.S. Cl.
CPC ......... *G02B 6/0065* (2013.01); *G02B 6/0068* (2013.01); *G02F 1/133605* (2013.01); *G02F 1/133606* (2013.01); *G02B 6/0073* (2013.01)

(56) References Cited

U.S. PATENT DOCUMENTS

| | | | |
|---|---|---|---|
| 2006/0044830 A1* | 3/2006 | Inoue | G02B 5/0278 |
| | | | 362/614 |
| 2009/0128740 A1* | 5/2009 | Lee | G02F 1/133611 |
| | | | 349/64 |
| 2020/0400998 A1* | 12/2020 | Lee | G02B 6/0055 |

FOREIGN PATENT DOCUMENTS

| | | | | |
|---|---|---|---|---|
| CN | 101821548 A | | 9/2010 | |
| CN | 101994951 A | | 3/2011 | |
| CN | 109188777 A | | 1/2019 | |
| CN | 109266097 A | * | 1/2019 | ............ C08J 7/0427 |
| CN | 109266097 A | | 1/2019 | |
| CN | 109557721 A | | 4/2019 | |
| CN | 110221476 A | | 9/2019 | |
| CN | 110398857 A | | 11/2019 | |
| CN | 209821564 U | | 12/2019 | |
| CN | 210181349 U | | 3/2020 | |
| JP | H06347792 A | | 12/1994 | |

\* cited by examiner

BACKLIGHT MODULE INCLUDING OPTICAL FILM AND MANUFACTURING METHOD THEREOF

This application is a Notional Phase of PCT Patent Application No. PCT/CN2020/101013 having international filing date of Jul. 9, 2020, which claims priority to Chinese Patent Application with the application No. 202010488219.6 filed on Jun. 2, 2020 with the National Intellectual Property Administration, the disclosure of which is incorporated by reference in the present application in its entirety.

BACKGROUND OF INVENTION

1. Field of Invention

The present invention relates to a technical field of displays, and particularly to, a backlight module and a manufacturing method thereof.

2. Related Art

Traditional backlights of low-end liquid crystal displays (LCDs) are shining as long as they are turned on, and are dimmed as long as they are turned off. However, due to limitations of various practical processes, materials, etc., traditional displays can only reach up to a contrast ratio of 5000:1. Visual effects of images displayed with such a contrast ratio are pooled. Traditional mid-range LCDs can be products with dozens to hundreds of local dimming partitions so that a contrast ratio is significantly increased. But, since the dimming partitions are limited to light-emitting diode (LED) pitches, etc., display effects as shown often have halos, adversely affecting viewing quality.

Therefore, mini LED technologies arise. Mini LED products can achieve a structure of thousands or even tens of thousands partitions, so that a contrast ratio can be increased to one million to one, thereby realizing best light and dark contrast display, and making qualitative leap progress compared with traditional displays.

Since electric current of mini LED backlight modules is connected from a single side, as wiring paths increases, IR drop will occur. As a result, brightness of backlight modules on incoming electricity sides is higher than brightness on sides of the backlight modules away from the incoming electricity sides, giving rise to uneven brightness in in-plane areas of the backlight modules.

Therefore, it is imperative to provide an improved technical solution to overcome the above-mentioned technical problem.

SUMMARY OF INVENTION

An object of the present invention is to provide a backlight module and a method of manufacturing the backlight module to overcome a problem of uneven brightness in an in-plane area of the backlight module because brightness of backlight modules on an incoming electricity side is higher than brightness of the backlight module away from the incoming electricity side.

The present invention provides a backlight module, comprising a substrate comprising a first end and a second end opposite to the first end; an ink layer disposed on the substrate and having a reflectivity gradually increasing from the first end to the second end; and a plurality of light-emitting units, wherein at least two of the light-emitting units are arranged in an array on the ink layer.

In the backlight module of the present invention, the ink layer is composed of a mixture of white ink and a metal oxide stirred together.

In the backlight module of the present invention, a content of the white ink is gradually reduced from the first end to the second end, or a content of the metal oxide gradually increases from the first end to the second end.

In the backlight module of the present invention, the metal oxide is at least one of titanium dioxide or aluminum oxide.

In the backlight module of the present invention, the ink layer at least comprises a first area and a second area sequentially arranged in a direction from the first end to the second end, wherein the reflectivity in the first area is less than the reflectivity in the second area.

In the backlight module of the present invention, a ratio of light transmittance in any adjacent regions in the first area and the second area is between one and two.

In the backlight module of the present invention, the backlight module further comprises an optical film disposed on the light-emitting units and configured to enable light emitted by the light-emitting units to pass therethrough.

In the backlight module of the present invention, the optical film comprises a plurality of dot structures arranged in an array, and at least one of the light-emitting units corresponds to a center of the dot structures arranged in the array.

In the backlight module of the present invention, the dot structures comprise a convex lens structure.

In the backlight module of the present invention, the dot structures are composed of a plurality of protrusions, and at least two of the protrusions are arranged in an array.

The present invention further provides a method of manufacturing a backlight module, comprising step A: providing a substrate comprising a first end and a second end opposite to the first end; step B: forming an ink layer on the substrate, wherein the ink layer has a reflectivity gradually increasing from the first end to the second end; and step C: providing a plurality of light-emitting units arranged in an array.

In the method of manufacturing the backlight module of the present invention, step B comprises step b11: forming, by mixing white ink with a metal oxide, an ink material with a predetermined content ratio, wherein the predetermined content ratio at least comprises a first predetermined content ratio and a second predetermined content ratio, wherein the white ink accounts for a content of the ink material with the first predetermined content ratio greater than a content of the ink material with the second predetermined content ratio, or the metal oxide accounts for a content of the ink material with the first predetermined content ratio less than a content of the ink material with the second predetermined content ratio; and step b12: forming, by spraying the ink material with the first predetermined content ratio and the ink material with the second predetermined content ratio on the substrate, the ink layer having a reflectivity gradually increasing, wherein the ink material with the first predetermined content ratio is sprayed on part of the substrate adjacent to the first end, and the ink material with the second predetermined content ratio is sprayed on part of the substrate away from the first end.

In the method of manufacturing the backlight module of the present invention, the metal oxide is at least one of titanium dioxide or aluminum oxide.

In the method of manufacturing the backlight module of the present invention, the ink layer at least comprises a first area and a second area sequentially arranged in a direction from the first end to the second end, wherein the reflectivity in the first area is less than the reflectivity in the second area.

In the method of manufacturing the backlight module of the present invention, a ratio of light transmittance in any adjacent regions in the first area and the second area is between one and two.

In the method of manufacturing the backlight module of the present invention, the method further comprises step D: disposing an optical film on the light-emitting units, wherein the optical film is configured to enable light emitted by the light-emitting units to pass therethrough.

In the method of manufacturing the backlight module of the present invention, the optical film comprises a plurality of dot structures arranged in an array, and at least one of the light-emitting units corresponds to a center of the dot structures arranged in the array.

In the method of manufacturing the backlight module of the present invention, the dot structures comprise a convex lens structure.

In the method of manufacturing the backlight module of the present invention, the dot structures are composed of a plurality of protrusions, and at least two of the protrusions are arranged in an array.

In the method of manufacturing the backlight module of the present invention, the projections located adjacent to the light-emitting units have a height less than that of the projections away from the light-emitting units.

Since electric current of a mini LED backlight module is connected from a single side, as wiring paths increases, IR drop will occur. As a result, brightness of the backlight module on an incoming electricity side is higher than brightness on a side of the backlight module away from the incoming electricity side, giving rise to uneven brightness in an in-plane area of the backlight module. The present invention has following advantageous effects: by disposing an ink layer having a reflectivity gradually increasing on a substrate, such that the reflectivity of the ink layer gradually increasing from a first end (near an incoming electricity side) to a second end (away from the incoming electricity side) so that an amount of light passing through the ink layer is gradually reduced from the first end to the second end, the backlight module of the present invention is capable of overcoming an uneven brightness problem in an in-plane area of the backlight module due to a situation that brightness of the backlight module on the incoming electricity side is higher than brightness of the backlight module away from the incoming electricity side.

In addition, the invention provides a white ink layer on the substrate. Since the ink layer has a high reflectivity, it can reflect the light emitted by the light-emitting units to the optical film. Furthermore, the ink layer can also reflect the light reflected by the optical film to the optical film again, thereby improving utilization of light. Still further, In the present invention, the ink layer is directly disposed on the substrate, which can replace a conventional reflection sheet, thereby saving the production cost.

Finally, the backlight module of the present invention further includes the optical film configured with dot structures having protrusions with different heights. When the height of the protrusions is small, it facilitates diffusion of light; and when the height of the protrusions away from the light-emitting units is great, it facilitates concentration of light, thereby a light source of a display surface can emit light uniformly.

DESCRIPTION OF PREFERRED EMBODIMENTS

Figure 1:
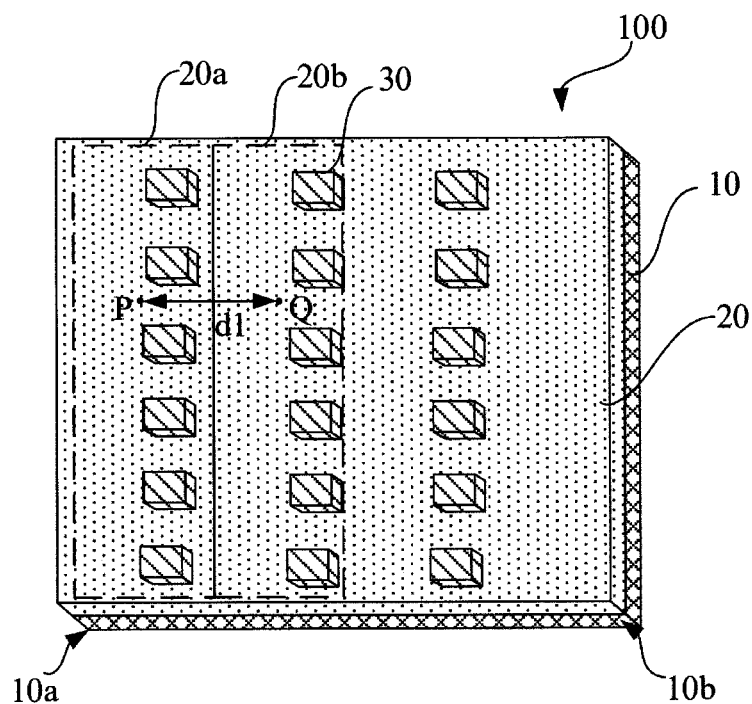
FIG. 1 is a schematic structural view of a backlight module in accordance with an embodiment of the present invention.

In order to make the objectives, technical solutions and advantages of the present invention clearer, the present invention will be further described in detail below with reference to the drawings. Please refer to the drawings in which the same component symbols represent the same components. The following description is based on the specific embodiments of the invention shown, which should not be construed as limiting other specific embodiments of the invention that are not detailed here. The term "embodiment" used in this specification means an example, example, or illustration.

In the description of the present application, it is to be understood that the term "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicates orientation or the orientation or positional relationship based on the positional relationship shown in the drawings, for convenience of description only and the present invention is to simplify the description, but does not indicate or imply that the device or element referred to must have a particular orientation in a particular orientation construction and operation, and therefore not be construed as limiting the present invention. Moreover, the terms "first" and "second" and the like are used for descriptive purposes only and are not to be construed as indicating or implying relative importance. Thus, features defining "first" or "second" may include one or more of the described features either explicitly or implicitly. In the description of the present invention, the meaning of "a plurality" is two or more unless specifically and specifically defined otherwise.

In the present application, unless otherwise explicitly specified or limited, the terms "mounted", "linked", "connected", and like terms are to be broadly understood. For example, it may be a fixed connection, a detachably connection, or an integrally connection, or may be a mechanical connection, electrically connection, or a directly connection. Alternatively, it can also be connected indirectly through intervening structures, or may be interaction between the two internal communicating elements or two elements. Those of ordinary skill in the art, to be understood that the specific meanings in the present application in accordance with specific circumstances.

Please refer to FIG. 1. An embodiment of the present invention provides a backlight module 100 includes a substrate 10, an ink layer 20, and a plurality of light-emitting units 30. The substrate 10 includes a first end 10a and a second end 10b opposite to the first end 10a. The ink layer 20 is disposed on the substrate 10 and has a reflectivity gradually increasing from the first end 10a to the second end 10b. At least two of the light-emitting units 30 are arranged in an array on the ink layer 20. The substrate 10 may be a glass substrate or a flexible substrate. The light-emitting units 30 include mini light-emitting diode (LED) light-emitting units. The backlight module 100 includes a direct-type mini LED backlight module.

Specifically, the ink layer 20 is formed by mixing and stirring white ink and a metal oxide. The metal oxide is a material with high reflectivity such as titanium dioxide (white powder titanium dioxide) or alumina. Specifically, a content of the white ink is gradually reduced from the first end 10a to the second end 10b, or a content of the metal oxide gradually increases from the first end 10a to the second end 10b. That is, in the embodiment of the present invention, the reflectivity of the ink layer 20 gradually increasing is achieved by adjusting a ratio of the white ink to the metal oxide. It should be noted that in order to achieve a reflectivity of the ink layer 20 gradually increasing from the first end 10a to the second end 10b, when a content of the metal oxide is unchanged, a content of the white ink is gradually decreasing from the first end 10a to the second end 10b. Alternatively, when a content of the white ink remains unchanged, a content of the metal oxide is gradually increasing from the first end 10a to the second end 10b. However, a gradually increasing reflectivity of the ink layer 20 is not limited to be achieved by adjustment of a ratio of the white ink to the metal oxide.

Please continue referring to FIG. 1, the ink layer 20 at least includes a first area 20a and a second area 20b sequentially arranged in a direction from the first end 10a to the second end 10b, wherein the reflectivity in the first area 20a is less than the reflectivity in the second area 20b. Specifically, a ratio of a reflectivity R1 of the first area 20a to a reflectivity R2 of the second area 20b is between 0 and 1 (excluding 0 and 1). Further, since brightness attenuation of the backlight module theoretically decreases uniformly, in the direction from the first end 10a of the substrate 10 to the second end 10b, a spacing d1 is defined between a midpoint P of the first area 20a and a midpoint Q of the second area 20b, and if a light intensity at the midpoint Q is reduced by N % compared to a light intensity at the midpoint P, a reflectivity of the ink layer 20 increases from the midpoint P to the midpoint Q by N %. It should be noted that in the embodiment of the present invention, widths of the first area 20a and the second area 20b depend on actual needs. The more uniform the transition between the reflectivity of the first area 20a and the second area 20b is, the better the uniform brightness is. That is, a reflectivity of the ink layer 20 is gradually slightly increasing in a horizontal direction from the first end 10a to the second end 10b.

The ink layer 20 of the present invention is directly formed by an inkjet printing process, which can effectively improve production efficiency and save production costs. In addition, the ink layer 20 formed by inkjet printing has high reliability and stability.

Figure 2:
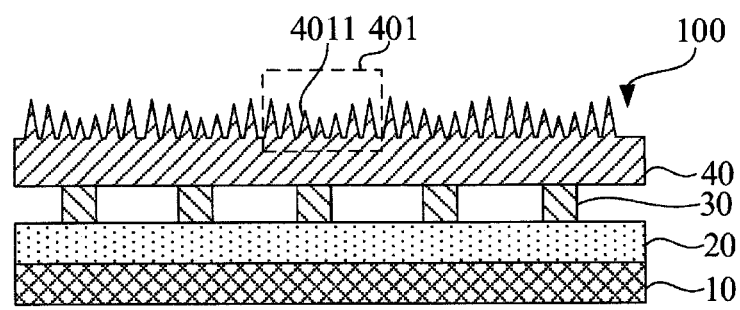
FIG. 2 is a cross-sectional view of a backlight module in accordance with an embodiment of the present invention.

Particularly, please continue referring to FIGS. 1 and 2. Light transmittance T1 in any region in the first area 20a is greater than light transmittance T2 in any region in the second area 20b adjacent to the region in the first area 20a. That is, the light transmittance T1 in the first area 20a adjacent to the first end 10a is greater than the light transmittance T2 in the second area 20b away from the first end 10a. Specifically, a ratio of T1 to T2 is between one and two (one in exclusion). For example, a ratio of T1 and T2 is any one of 1.01, 1.02, 1.03, 1.04, 1.05, 1.06, 1.07, 1.08, 1.09, 1.1.

Please refer to FIG. 2. The backlight module 100 of an embodiment of the present invention further includes an optical film 40. The optical film 40 is disposed on the light-emitting units 30 and is configured to enable light emitted by the light-emitting units 30 to pass through the optical film 40. The optical film 40 is provided with a plurality of dot structures 401 arranged in an array on the optical film 40. At least one of the light-emitting units 30 corresponds to a center of the dot structures 401 arranged in the array. Specifically, the dot structures 401 are disposed on a side of the optical film 40 away from the light-emitting units 30. The dot structures 401 are used to diffuse the light of the light-emitting units 30. The dot structures 401 are a convex lens structure. Further, the dot structures 401 are composed of a plurality of protrusions 4011, and at least two of the protrusions 4011 are arranged in an array. It should be noted that in the embodiment of the present invention the protrusions 4011 adjacent to the light-emitting units 30 have a height less than that of the projections 4011 away from the light-emitting units 30. In this manner, since light intensity near the light-emitting unit 30 is high, it is beneficial to the diffusion of light when the height of the protrusions 4011 is small. Likewise, light intensity away from the light-emitting diodes 30 is low, and when the height of the protrusion 4011 is large, it is favorable for concentration of light, so that a light source of a display surface can emit light uniformly. The optical film 40 is made of light-transmissive materials, specifically, including glass, polymethyl methacrylate, polycarbonate, etc. Optionally, a side of the optical film 40 near the light-emitting units 30 is further provided with a convex lens for collecting light emitted by the light-emitting units 30.

Since electric current of a mini LED backlight module is connected from a single side, as wiring paths increases, IR drop will occur. As a result, brightness of the backlight module on an incoming electricity side is higher than brightness of the backlight module away from the incoming electricity side, giving rise to uneven brightness in an in-plane area of the backlight module 100. By disposing an ink layer having a reflectivity gradually increasing on a substrate, such that the reflectivity of the ink layer gradually increasing from a first end (near an incoming electricity side) to a second end (away from the incoming electricity side) so that an amount of light passing through the ink layer is gradually reduced from the first end to the second end, the backlight module of the present invention is capable of overcoming an uneven brightness problem in an in-plane area of the backlight module due to a situation that brightness of the backlight module on the incoming electricity side is higher than brightness of the backlight module away from the incoming electricity side.

Figure 3:
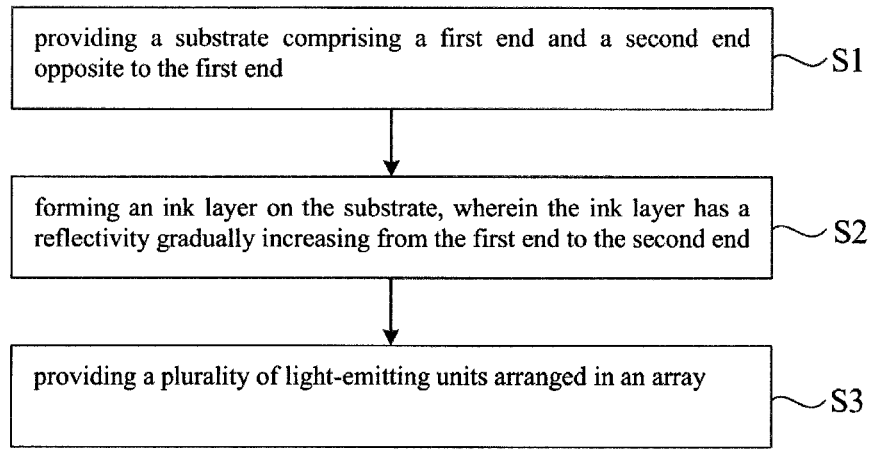
FIGS. 3 and 4 are flowcharts showing a method of manufacturing a backlight module in accordance with an embodiment of the present invention.

Please refer to FIG. 1 in combination with FIG. 3. The present invention further provides a method of manufacturing a backlight module. The method includes following steps:

Step S1: providing a substrate including a first end and a second end opposite to the first end, wherein a substrate 10 may be a glass substrate or a flexible substrate.

Step S2: forming an ink layer on the substrate, wherein the ink layer has a reflectivity gradually increasing from the first end to the second end.

Specifically, the ink layer 20 is formed by mixing and stirring white ink and a metal oxide. The metal oxide is titanium dioxide (white powder titanium dioxide) or alumina. Specifically, a content of the white ink is gradually reduced from the first end 10a to the second end 10b, or a content of the metal oxide gradually increases from the first end 10a to the second end 10b. It should be noted that in order to achieve a reflectivity of the ink layer 20 gradually increasing from the first end 10a to the second end 10b, when a content of the metal oxide is unchanged, a content of the white ink is gradually decreasing from the first end 10a to the second end 10b. Alternatively, when a content of the white ink remains unchanged, a content of the metal oxide is gradually increasing from the first end 10a to the second end 10b.

Step S3: providing a plurality of light-emitting units arranged in an array.

Specifically, the light-emitting units 30 include mini light-emitting diode (LED) light-emitting units.

Figure 4:
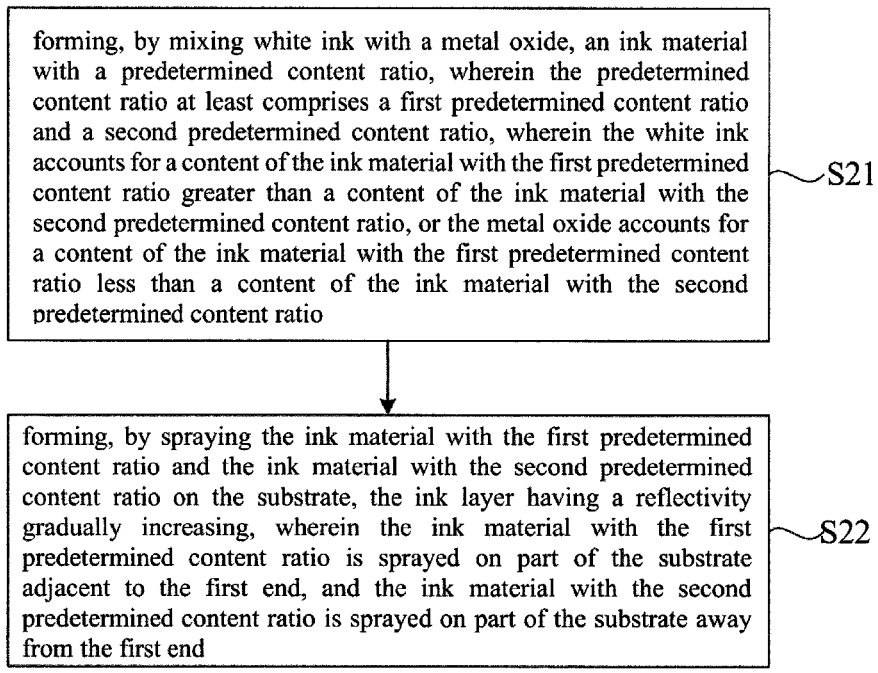

Please refer to FIG. 4. Step S2 includes:

Step S21: forming an ink material with a predetermined content ratio by mixing white ink with a metal oxide, wherein the predetermined content ratio at least includes a first predetermined content ratio and a second predetermined content ratio, wherein the white ink accounts for a content of the ink material with the first predetermined content ratio greater than a content the white ink accounts for the ink material with the second predetermined content ratio, or the metal oxide accounts for a content of the ink material with the first predetermined content ratio less than a content the white ink accounts for the ink material with the second predetermined content ratio.

Step S22: forming the ink layer having a reflectivity gradually increasing by spraying the ink material with the first predetermined content ratio and the ink material with the second predetermined content ratio on the substrate, wherein the ink material with the first predetermined content ratio is sprayed on part of the substrate adjacent to the first end, and the ink material with the second predetermined content ratio is sprayed on part of the substrate away from the first end.

For example, please refer to FIGS. 1 and 2. In step S21, evenly mix white inks with the mass concentration of c1 and c2 with metal oxides of the same concentration, where c1 is less than c2. Alternatively, evenly evenly mix white inks with the mass concentration of c3 and c4 with metal oxides of the same concentration, where c3 is greater than c4, to form an ink material with a first predetermined content ratio and an ink material with a second predetermined content ratio. It should be noted that the ink material with the predetermined content ratio at least includes an ink material with a first predetermined content ratio, and an ink material with a second predetermined content ratio. The invention can form an ink layer 20 with different reflectivity according to different ratios of the white ink and the metal oxide.

Next, in step S22, fill the ink material with the first predetermined content ratio and the ink material with the second predetermined content ratio into different nozzles. The ink material with the first predetermined content ratio is sprayed on part of the substrate 10 adjacent to the first end 10a, and the ink material with the second predetermined content ratio is sprayed on part of the substrate 10 away from the first end 10a through an inkjet printing process. After heating and curing, the ink layer 20 with gradually increasing reflectivity is formed. Inkjet printing includes at least two nozzles, a speed of inkjet printing of each of the nozzles is between 30 millimeters (mm)/second (sec) and 200 mm/sec, ink output of the two nozzles is between 3 picoliters and 45 picoliters, and ink frequency is 6 kHz~12 kHz. A distance between each nozzle and a surface of the ink layer 20 of the substrate 10 to be formed is between 0.5 mm and 2 mm.

The ink layer 20 at least includes a first area 20a and a second area 20b sequentially arranged in a direction from the first end 10a to the second end 10b, wherein the reflectivity in the first area 20a is less than the reflectivity in the second area 20b. Specifically, a ratio of a reflectivity R1 in the first area 20a to a reflectivity R2 in the second area 20b is between 0 and 1 (excluding 0 and 1). Further, since brightness attenuation of the backlight module theoretically decreases uniformly, in the direction from the first end 10a of the substrate 10 to the second end 10b, a spacing d1 is defined between a midpoint P of the first area 20a and a midpoint Q of the second area 20b, and if a light intensity at the midpoint Q is reduced by N % compared to a light intensity at the midpoint P, a reflectivity of the ink layer 20 increases from the midpoint P to the midpoint Q by N %. It should be noted that in the embodiment of the present invention, widths of the first area 20a and the second area 20b depend on actual needs. The more uniform the transition between the reflectivity of the first area 20a and the second area 20b is, the better the uniform brightness is. That is, a reflectivity of the ink layer 20 is gradually slightly increasing in a horizontal direction from the first end 10a to the second end 10b.

Light transmittance T1 in any region in the first area 20a is greater than light transmittance T2 in any region in the second area 20b adjacent to the region in the first area 20a. That is, the light transmittance T1 in the first area 20a adjacent to the first end 10a is greater than the light transmittance T2 in the second area 20b away from the first end 10a. Specifically, a ratio of T1 to T2 is between one and two (one in exclusion). For example, a ratio of T1 and T2 is any one of 1.01, 1.02, 1.03, 1.04, 1.05, 1.06, 1.07, 1.08, 1.09, 1.1.

After step S3, an optical film 40 is further disposed on the light-emitting units 30. The optical film 40 is configured to enable light emitted by the light-emitting units 30 to pass through the optical film 40. The optical film 40 is provided with a plurality of dot structures 401 arranged in an array on the optical film 40. At least one of the light-emitting units 30 corresponds to a center of the dot structures 401 arranged in the array. Specifically, the dot structures 401 are disposed on a side of the optical film 40 away from the light-emitting units 30. The dot structures 401 are used to diffuse the light of the light-emitting units 30. The dot structures 401 are a convex lens structure. Further, the dot structures 401 are composed of a plurality of protrusions 4011, and at least two of the protrusions 4011 are arranged in an array. It should be noted that in the embodiment of the present invention the protrusions 4011 adjacent to the light-emitting units 30 have a height less than that of the projections 4011 away from the light-emitting units 30. In this manner, since light intensity near the light-emitting unit 30 is high, it is beneficial to the diffusion of light when the height of the protrusions 4011 is small. Likewise, light intensity away from the light-emitting diodes 30 is low, and when the height of the protrusion 4011 is large, it is favorable for concentration of light, so that a light source of a display surface can emit light uniformly. The optical film 40 is made of light-transmissive materials, specifically, including glass, polymethyl methacrylate, polycarbonate, etc. Optionally, a side of the optical film 40 near the light-emitting units 30 is further provided with a convex lens for collecting light emitted by the light-emitting units 30.

Since electric current of a mini LED backlight module is connected from a single side, as wiring paths increases, IR drop will occur. As a result, brightness of the backlight module on an incoming electricity side is higher than brightness of the backlight module away from the incoming electricity side, giving rise to uneven brightness in an in-plane area of the backlight module 100. By disposing an ink layer having a reflectivity gradually increasing on a substrate, such that the reflectivity of the ink layer gradually increasing from a first end (near an incoming electricity side) to a second end (away from the incoming electricity side) so that an amount of light passing through the ink layer is gradually reduced from the first end to the second end, the backlight module of the present invention is capable of overcoming an uneven brightness problem in an in-plane area of the backlight module due to a situation that brightness of the backlight module on the incoming electricity side is higher than brightness of the backlight module away from the incoming electricity side.

In addition, the invention provides a white ink layer on the substrate. Since the ink layer has a high reflectivity, it can reflect the light emitted by the light-emitting units to the optical film. Furthermore, the ink layer can also reflect the light reflected by the optical film to the optical film again, thereby improving utilization of light. Still further, in the present invention, the ink layer is directly disposed on the substrate, which can replace a conventional reflection sheet, thereby saving the production cost.

Finally, the backlight module of the present invention further includes the optical film configured with dot structures having protrusions with different heights. When the height of the protrusions is small, it facilitates diffusion of light; and when the height of the protrusions away from the light-emitting units is great, it facilitates concentration of light, thereby a light source of a display surface can emit light uniformly.

Accordingly, although the present invention has been disclosed as a preferred embodiment, it is not intended to limit the present invention. Those skilled in the art without departing from the present invention may make various changes or modifications, and thus the scope of the present invention should be after the appended claims and their equivalents.

What is claimed is:

1. A backlight module, comprising:
   a substrate comprising a first end and a second end opposite to the first end;
   an ink layer disposed on the substrate and having a reflectivity gradually increasing from the first end to the second end;
   a plurality of light-emitting units, wherein at least two of the light-emitting units are arranged in an array on the ink layer; and
   an optical film disposed on the light-emitting units and configured to enable light emitted by the light-emitting units to pass therethrough, wherein the optical film comprises a plurality of dot structures arranged in an array, each of the dot structures are composed of a plurality of protrusions, and a height of the protrusions adjacent to the light-emitting units is less than that of the protrusions away from the light-emitting units.

2. The backlight module of claim 1, wherein the ink layer is composed of a mixture of white ink and a metal oxide stirred together.

3. The backlight module of claim 2, wherein a content of the white ink is gradually reduced from the first end to the second end, or a content of the metal oxide gradually increases from the first end to the second end.

4. The backlight module of claim 2, wherein the metal oxide is at least one of titanium dioxide or aluminum oxide.

5. The backlight module of claim 1, wherein the ink layer at least comprises a first area and a second area sequentially arranged in a direction from the first end to the second end, wherein the reflectivity in the first area is less than the reflectivity in the second area.

6. The backlight module of claim 5, wherein a ratio of light transmittance in any adjacent regions in the first area and the second area is between one and two.

7. The backlight module of claim 1, wherein at least one of the light-emitting units corresponds to a center of the dot structures arranged in the array.

8. The backlight module of claim 1, wherein the dot structures comprise a convex lens structure.

9. The backlight module of claim 1, wherein at least two of the protrusions are arranged in an array.

10. A method of manufacturing a backlight module, comprising:
    step A: providing a substrate comprising a first end and a second end opposite to the first end;
    step B: forming an ink layer on the substrate, wherein the ink layer has a reflectivity gradually increasing from the first end to the second end;
    step C: providing a plurality of light-emitting units arranged in an array; and
    step D: disposing an optical film on the light-emitting units, wherein the optical film is configured to enable light emitted by the light-emitting units to pass therethrough, the optical film comprises a plurality of dot structures arranged in an array, each of the dot structures are composed of a plurality of protrusions, and a height of the protrusions adjacent to the light-emitting units is less than that of the protrusions away from the light-emitting unit.

11. The method of manufacturing the backlight module of claim 10, where step B comprises:
    step b11: forming, by mixing white ink with a metal oxide, an ink material with a predetermined content ratio, wherein the predetermined content ratio at least comprises a first predetermined content ratio and a second predetermined content ratio, wherein the white ink accounts for a content of the ink material with the first predetermined content ratio greater than a content of the ink material with the second predetermined content ratio, or the metal oxide accounts for a content of the ink material with the first predetermined content ratio less than a content of the ink material with the second predetermined content ratio; and
    step b12: forming, by spraying the ink material with the first predetermined content ratio and the ink material with the second predetermined content ratio on the substrate, the ink layer having a reflectivity gradually increasing, wherein the ink material with the first predetermined content ratio is sprayed on part of the substrate adjacent to the first end, and the ink material with the second predetermined content ratio is sprayed on part of the substrate away from the first end.

12. The method of manufacturing the backlight module of claim 11, wherein the metal oxide is at least one of titanium dioxide or aluminum oxide.

13. The method of manufacturing the backlight module of claim 10, wherein the ink layer at least comprises a first area and a second area sequentially arranged in a direction from the first end to the second end, wherein the reflectivity in the first area is less than the reflectivity in the second area.

14. The method of manufacturing the backlight module of claim 10, wherein a ratio of light transmittance in any adjacent regions in the first area and the second area is between one and two.

15. The method of manufacturing the backlight module of claim 10, wherein at least one of the light-emitting units corresponds to a center of the dot structures arranged in the array.

16. The method of manufacturing the backlight module of claim 10, wherein the dot structures comprise a convex lens structure.

17. The method of manufacturing the backlight module of claim 10, wherein at least two of the protrusions are arranged in an array.

\* \* \* \* \*